UNITED STATES PATENT OFFICE.

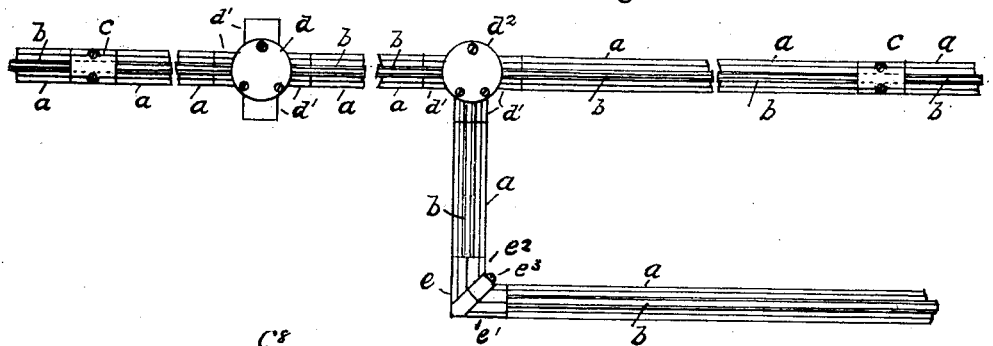
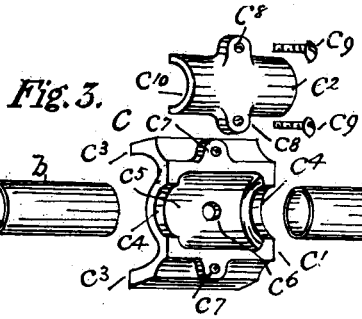
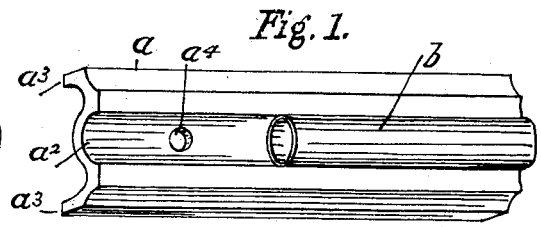
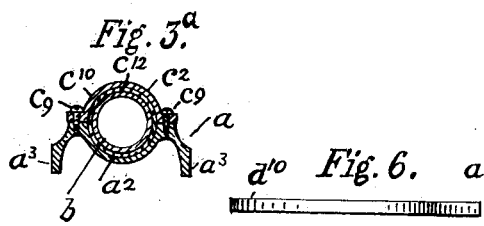
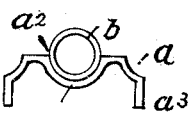
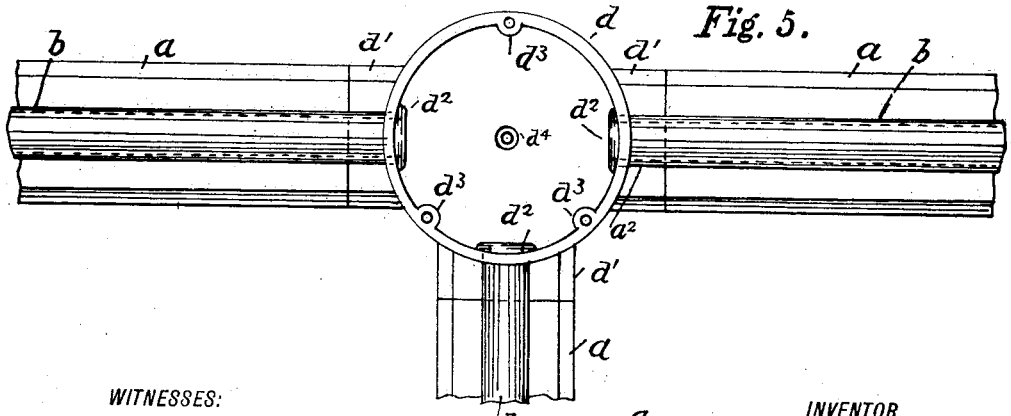

FREDERIC WM. ERICKSON, OF NEW YORK, N. Y.

INTERIOR-CONDUIT DISTRIBUTION.

997,282.

Specification of Letters Patent. Patented July 11, 1911.

Application filed October 14, 1910. Serial No. 586,971.

*To all whom it may concern:*

Be it known that I, FREDERIC WM. ERICKSON, residing at New York, in the county of New York and State of New York, have invented certain Improvements in Interior-Conduit Distribution, of which the following is a specification.

The present invention relates to a system of interior conduit distribution in which insulated conductors are threaded through pipes which are supported by moldings secured to the walls and ceilings of buildings, a suitable depression being made in said moldings in which the pipes are located and fixed.

In the improvement forming the subject-matter of this invention the moldings are made with edges to rest upon the surfaces of the walls and ceilings so that an even and close contact is made therewith, and the side edges and upper surfaces of the molding are made ornamental in order to present an attractive appearance.

The invention also contemplates the construction of couplings for the pipe ends and of distributing and switch boxes associated therewith, in a manner to correspond in general design with the moldings, and when the instrumentalities are assembled upon the walls and ceilings of a building by their construction they are brought into close contact and relation to each other to form a harmonious appearance. All of which I will now proceed to describe in detail and point out in particular in the appended claims.

In the drawings which form a part of this specification, and illustrate the same—Figure 1 is a perspective view of a piece of molding and of a conduit or pipe resting upon the same. Fig. 2 is a schematic view to illustrate the system of distribution in actual use and appearance. Fig. 3 illustrates perspectively in detail a coupling for the ends of pipes. Fig. $3^a$ is a cross-section of the coupling as assembled. Fig. 4 is an end view of the molding and conduit. Fig. 5 is a plan view of a connection box with its cover removed connected with molding on each side, and Fig. 6 is an edge view of the box cover.

In the drawings $a$ is a supporting and carrying member consisting of a molding made of any suitable material as rolled metal, wood, papier mâché, having two extensions or legs $a^3$ forming edges to rest upon the surfaces of walls or ceilings so that the molding will find suitable bearing, the corners being concaved and the top flat with an open and shallow hollow or groove $a^2$ central thereof. The body of the molding is made as thin as possible consistent with strength and preferably of even thickness. The molding may be of any design preferred, having bearing edges or legs $a^3$ and a groove $a^2$, the idea being that it shall present an attractive contour when in place, and its ends are at right angles to its sides, and at suitable distances apart holes $a^4$ are made in the hollow through which screws are inserted to be screwed into the walls or ceilings to hold the molding in place.

Referring to Fig. 2, which represents a section of the conduit in place, $a$ is the molding shown in sections between which are couplings $c$, and $d$ are connection boxes and $e$ represents a right-angled elbow. The couplings $c$ are intended to join the ends of two pieces of pipe or conduit $b$ which abut each other, and they consist of a base part having the same cross-section as the molding (see Fig. $3^a$ which is a cross-section of a coupling and Fig. 4 which shows the contour of the molding) and $c^2$ is the cover or binding part provided with perforated lugs $c^8$ adapted to register with the perforated screw-threaded lugs $c^7$ of the base part; the interior $c^5$ of the base part and the interior of the cover are of larger diameter than the curved entrances $c^4$ and $c^{10}$ in order that suitable packing material $c^{12}$ may be introduced to make a water-tight joint. When two ends of the conduit $b$ are to be joined they are placed in the base part, their ends abutting, and suitable packing $c^{12}$ is placed in the enlarged portion or chamber $c^5$ and also in the corresponding chamber of the cover which is then secured in place by the screws $c^9$.

The elbow $e$ is made in two parts $e^1$ and $e^2$ which are joined along their axial lines and are secured together by a screw $e^3$, which extends into abutting lugs. The ends of the pipes $b$ extend into the ends of the elbows and are secured when the screw is tightened. When it is desired to introduce a distributing box, a switch, or a translating device as an electric lamp, one having the general characteristics of that shown as $d$ is put in between the ends of the molding in which the box portion is represented as circular (though any preferred shape may be used) having extending from its sides the parts $d^1$ of the same contour as the molding with right-angled ends to abut against the ends of the molding, while the conduit or pipe rests in the hollows $a^2$ of the extensions. Its ends extend into the box and may terminate in rounded bushings $d^2$, or the bushings may form a part of the wall of the box. The cover $d^{10}$ is secured to the box by screws passing into the lugs $d^3$, while the boxes are fastened to the walls by screws through the openings $d^4$. Two or more extensions $d^1$ may be provided on the boxes $d$ according to the system of conduits to be run. Any suitable elbows $e$ may be used which are constructed to carry out the general scheme of decorative effect and which are divided as hereinbefore described. The pipes or conduits are delivered from the manufacturers in ten feet lengths, and are cut to fit any situation, and the rolled metal molding will be made in lengths a little less than ten feet. By this construction the entire system may be put in place on walls or ceilings without the use of special tools to thread the pipes together, and the system provides for the insulated conductors to be drawn into the conduits or pipes after they are in place, all the fittings being so designed that access may be had to the wiring connections at the elbows by the removal of the screws $e^3$, or the lighting or control outlets by the removal of the covers $d^{10}$, as will be readily understood, and as the packing employed to make the joints on the assembled parts is preferably of some electric conducting material, an electrical connection is maintained throughout all the conduits.

It will be seen that the details of construction of the parts may be widely varied within the spirit of the invention as, however, may be understood from the foregoing description.

I claim as my invention—

1. A system of interior conduit distribution consisting of two or more lengths of a supporting and carrying molded member having two longitudinal parallel supporting edges and a longitudinal concave depression on its outer side, of conduits or pipes in the depression of the members with coupling members abutting the carrying members composed of a base and a cover adapted to inclose and support the ends of said pipes or conduits, with means for attaching said members to the walls or ceilings.

2. A system of interior conduit distribution consisting of two or more lengths of a supporting molded member having two longitudinal parallel supporting edges and a longitudinal concave depression on its outer side, of conduits or pipes in the said depression of the members, with coupling members abutting the carrying members composed of a base and a cover adapted to inclose and support the ends of said pipes or conduits with means for attaching said members to the walls or ceilings, the exterior surfaces of the carrying and coupling members being molded to present an attractive and harmonious appearance.

3. A system of interior conduit distribution, consisting of a plurality of lengths of a supporting molded member having two longitudinal parallel supporting edges and a longitudinal concave depression on its outer side, of conduits or pipes in the said depression of the members, of fittings interposed between said molded members and abutting the same, molded to conform in general appearance to said molded members, as set forth.

4. A system of interior conduit distribution, consisting of a plurality of lengths of a supporting molded member having two longitudinal parallel supporting edges and a longitudinal concave depression on its outer side, of conduits or pipes in the said depression of the members, of fittings interposed between said molded members and abutting the same, each fitting adapted to receive and retain the ends of the pipes or conduits, and molded to conform in general appearance to said molded members, as set forth.

5. A system of interior conduit distribution consisting of a plurality of lengths of a supporting molded member having two longitudinal parallel supporting edges and a longitudinal concave depression on its outer side, of conduits or pipes in said depressions of the members, of fittings and separable elbows interposed between said molded members and abutting the same, each fitting adapted to receive and retain the ends of the pipes or conduits, and molded to conform in general appearance to said molded members, whereby a continuous passage is provided for insulated conductors through the pipes or conduits and the fittings, as set forth.

In testimony whereof, I have signed my name to this specification in the presence of two subscribing witnesses, this 12th day of October 1910.

FREDERIC WM. ERICKSON.

Witnesses:
HARRIET LEVI,
JOHN A. COLE.